US009722958B2

(12) United States Patent
Hewitt et al.

(10) Patent No.: US 9,722,958 B2
(45) Date of Patent: Aug. 1, 2017

(54) RECOMMENDATION OF A LOCATION RESOURCE BASED ON RECIPIENT ACCESS

(71) Applicant: International Business Machines Corporation, Armonk, NY (US)

(72) Inventors: Trudy L. Hewitt, Cary, NC (US); Francesco C. Schembari, Durham, NC (US); Robert M. Schwenn, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 14/335,086

(22) Filed: Jul. 18, 2014

(65) Prior Publication Data
US 2016/0021037 A1    Jan. 21, 2016

(51) Int. Cl.
*G06F 17/30* (2006.01)
*H04L 12/58* (2006.01)
(Continued)

(52) U.S. Cl.
CPC ...... *H04L 51/046* (2013.01); *G06F 17/30864* (2013.01); *H04L 51/08* (2013.01);
(Continued)

(58) Field of Classification Search
CPC .................................................. G06F 17/30864
(Continued)

(56) References Cited

U.S. PATENT DOCUMENTS 6,182,193 B1 *   1/2001   Hamami ............. H04L 12/5601
                                                  370/236
8,073,910 B2 * 12/2011   Tokuda ................ G06Q 10/107
                                                  709/206
(Continued)

FOREIGN PATENT DOCUMENTS

CA   2754015 A1 * 11/2010 ........... G06Q 10/107
EP   0869652 A2    10/1998
(Continued)

OTHER PUBLICATIONS

IBM, "Method to interconvert a link and a content in an e-mail document", IP.com Prior Art Database Technical Disclosure, IP.com No. IPCOM000181062D, Published Mar. 25, 2009. http://ip.com/IPCOM/000181062.*

(Continued)

*Primary Examiner* — Mark E Hershley
(74) *Attorney, Agent, or Firm* — Jared L. Montanaro

(57) ABSTRACT

The method includes receiving a first message to a plurality of user profiles and having a location resource to a first content item. The method also includes determining that a grouping of user profiles from a plurality of recipients do not have access permission to the location resource. The method also includes identifying a first content data for the first content item. The method also includes selecting a first user profile from the grouping of user profiles. The method also includes receiving an access permission for the first user profile to a first plurality of content items. The method also includes recommending one or more repositories for the first (Continued)

user profile based on a similarity of the first content item to a second content item within the one or more repositories that shares at least part of the first content data.

20 Claims, 11 Drawing Sheets

(51) Int. Cl.
  *H04L 29/06* (2006.01)
  *H04W 4/12* (2009.01)
  *H04W 12/08* (2009.01)
(52) U.S. Cl.
  CPC .............. *H04L 51/18* (2013.01); *H04L 51/32* (2013.01); *H04L 63/102* (2013.01); *H04L 63/104* (2013.01); *H04W 4/12* (2013.01); *H04W 12/08* (2013.01)
(58) Field of Classification Search
  USPC ........................................................ 707/610
  See application file for complete search history.

(56) References Cited

U.S. PATENT DOCUMENTS

| | | | |
|---|---|---|---|
| 8,254,538 B1* | 8/2012 | Watts .................... | H04L 12/589 358/1.15 |
| 8,255,480 B2* | 8/2012 | Bedingfield, Sr. .................... | G06F 17/30887 709/217 |
| 8,346,878 B2* | 1/2013 | Bhogal ................ | G06Q 10/107 709/206 |
| 8,429,103 B1* | 4/2013 | Aradhye .............. | G06N 99/005 706/12 |
| 8,543,575 B2* | 9/2013 | Martin .............. | G06F 17/30038 707/737 |
| 8,543,675 B1* | 9/2013 | Yiu .................... | G06F 17/30899 709/223 |
| 8,943,594 B1* | 1/2015 | Arrowood ............... | G06F 21/53 726/23 |
| 9,398,014 B2 | 7/2016 | Hewitt et al. | |
| 9,407,639 B2 | 8/2016 | Hewitt et al. | |
| 2002/0046043 A1* | 4/2002 | Smith .................... | G06Q 40/00 705/35 |
| 2006/0218234 A1* | 9/2006 | Deng .................. | H04L 51/066 709/206 |
| 2006/0253771 A1 | 11/2006 | Baschy | |
| 2007/0061308 A1* | 3/2007 | Hartwell ............... | G06F 3/0484 |
| 2008/0120382 A1* | 5/2008 | Heidloff ............... | G06Q 10/107 709/206 |
| 2008/0133911 A1* | 6/2008 | Eisen ................... | H04L 63/0428 713/168 |
| 2009/0013374 A1* | 1/2009 | Tsai ...................... | H04L 12/585 726/1 |
| 2012/0254485 A1* | 10/2012 | Tamura ................... | G06F 9/544 710/56 |
| 2012/0304292 A1* | 11/2012 | Liu ......................... | H04L 61/30 726/22 |
| 2012/0317414 A1* | 12/2012 | Glover ................. | G06Q 10/101 713/165 |
| 2013/0091580 A1* | 4/2013 | Maha ................ | G06F 17/30867 726/26 |
| 2013/0337789 A1* | 12/2013 | Johnson .................. | H04W 4/02 455/414.1 |
| 2014/0013420 A1* | 1/2014 | Picionielli ............... | G06F 21/88 726/17 |
| 2014/0266720 A1* | 9/2014 | McGowan ......... | A63B 69/0048 340/541 |
| 2014/0379915 A1* | 12/2014 | Yang ..................... | H04L 63/101 709/225 |
| 2015/0074743 A1* | 3/2015 | Ilieva ..................... | H04L 63/20 726/1 |
| 2015/0288693 A1* | 10/2015 | Hewitt .................... | H04L 63/10 726/28 |
| 2016/0036842 A1* | 2/2016 | Lee ..................... | H04L 63/1416 726/4 |

FOREIGN PATENT DOCUMENTS

| | | |
|---|---|---|
| EP | 2296327 A1 | 3/2011 |
| WO | 02091296 A2 | 11/2002 |
| WO | 2013055564 A1 | 4/2013 |

OTHER PUBLICATIONS

Hewitt et al., "Validation of a Location Resource Based on Recipient Access," U.S. Appl. No. 15/141,244, filed Apr. 28, 2016.
List of IBM Patents or Patent Applications Treated as Related, Aug. 10, 2016, 2 pgs.
Hewitt et al., "Validation of a Location Resource Based on Recipient Access", U.S. Appl. No. 14/476,279, filed Sep. 3, 2014.
List of IBM Patents or Patent Applications Treated as Related.
Mell et al., "The NIST Definition of Cloud Computing", National Institute of Standards and Technology, NIST Special Publication 800-145, Sep. 2011, Gaithersburg, MD.
Hewitt et al., "Validation of a Location Resource Based on Recipient Access", U.S. Appl. No. 14/245,427, filed Apr. 4, 2014.

* cited by examiner

RECOMMENDATION OF A LOCATION RESOURCE BASED ON RECIPIENT ACCESS

BACKGROUND

The present disclosure relates to exchanging a message between users over a computer communications network, and more specifically, to validating location resources within messages for recipient access.

Messages are exchanged between users over communication networks. Some examples of messages include electronic mail, instant messaging (IM), and Short Message Service (SMS), i.e., text messaging. Emails are composed and sent using a mail client application. A given email message may include payload in the form of text or in-line figures, as well as attachments (e.g., documents, pictures, video files). Further, the email message may include hyperlinks. As is known, a hyperlink is a reference from one document (e.g., the email message) to another (e.g., a web page). Generally, a hyperlink facilitates content browsing. Content browsing refers to the retrieval and presentation of electronic content via a client application, such as a Web browser. Generally, content may include electronic documents, graphical images, audio, and audiovisual and video materials. Typically, content may be stored in a server environment and published for access by content consumers over a computer communications network such as the Internet. Content consumers, in turn, can retrieve content over the network by reference to a network address for the content. Once retrieved, the content may be rendered by the client application.

SUMMARY

Aspects of the present disclosure relate to a method, a system, and a computer program product for recommending an alternate location resource based on recipient access.

One embodiment is directed toward a method. The method includes receiving, by a computing node in a distributed computing environment and from a messaging application on a remote client computer, a first message to a plurality of recipients and having a location resource to a first content item outside of the remote client computer. The method also includes determining that a grouping of user profiles from the plurality of recipients do not have access permission to the location resource. The method also includes identifying a first content data for the first content item. The method also includes selecting a first user profile from the grouping of user profiles. The method also includes receiving an access permission for the first user profile to a first plurality of content items. The method also includes recommending one or more repositories for the first user profile based on the similarity of the first content item to a second content item within the one or more repositories. The method also includes determining a first alternate location resource, accessible to at least the first user profile, for the second content item within the one or more repositories.

Another embodiment is directed toward a system. The system may include a distributed computing environment. The distributed computing environment may also include one or more repositories. The distributed computer environment may also include a processing engine. The processing engine can be hosted by a computing node in the distributed computing environment. The processing engine can be configured to receive, from the messaging application, a grouping of user profiles that do not have access permission to the location resource for the first content item. The processing engine can also be configured to determine a first content data for the first content item. The processing engine can also be configured to select a first user profile from the grouping of user profiles. The processing engine can also be configured to receive an access permission for the first user profile to a first plurality of content items. The processing engine can also be configured to recommend one or more repositories for the first user profile based on the similarity of the first content item to a second content item within the one or more repositories that shares at least part of the first content data. The processing engine can also be configured to determine a first alternate location resource, accessible to at least the first user profile, for the second content item within the one or more repositories.

Another embodiment is directed toward a computer readable storage device having a computer readable program stored therein, wherein the computer readable program, when executed on a computing device, causes the computing device to receive, by a computing node in a distributed computing environment and from a messaging application on a remote client computer, a first message to a plurality of recipients and having a location resource to a first content item outside of the remote client computer. The computer readable program also causes the computing device to determine that a grouping of user profiles from the plurality of recipients do not have access permission to the location resource. The computer readable program also causes the computing device to determine a first content data for the first content item. The computer readable program also causes the computing device to select a first user profile from the grouping of user profiles. The computer readable program also causes the computing device to receive an access permission for the first user profile to a first plurality of content items. The computer readable program also causes the computing device to recommend one or more repositories for the first user profile based on a similarity of the first content item to a second content item within the one or more repositories that shares at least part of the first content data. The computer readable program also causes the computing device to determine a first alternate location resource, accessible to at least the first user profile, for the second content item within the one or more repositories.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
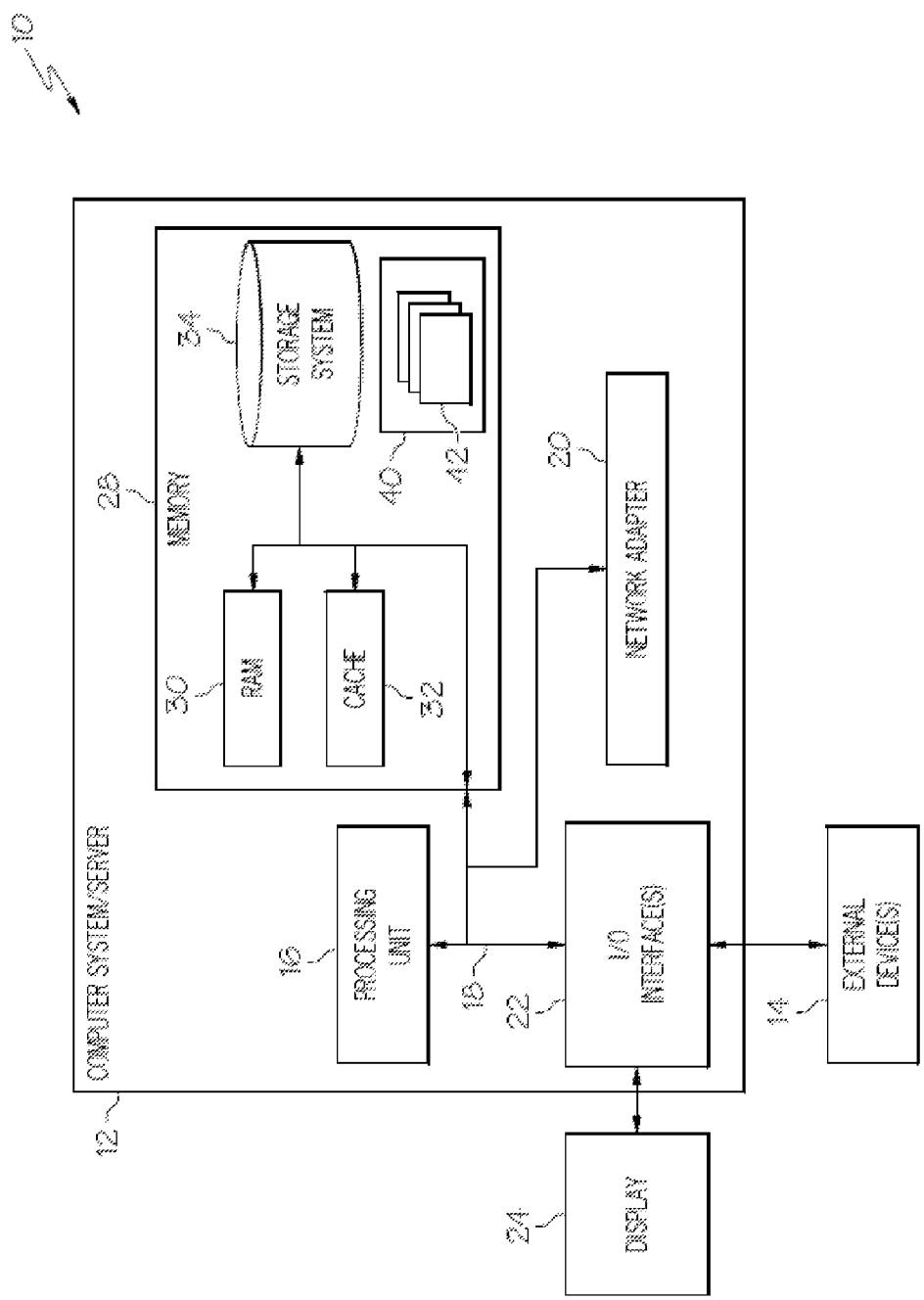
FIG. 1 illustrates an operating environment, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to exchanging a message between users over a computer communications network, and more specifically, to validating a location resource within messages for recipient access. Aspects of the present disclosure relate to validating that a recipient of a message has access to the location resource, e.g., a hyperlink, embedded in the message. If a recipient does not have access to the location resource, then an alternate location resource can be recommended as part of the message. In some embodiments, the alternate location resource can be identified by searching for a content item (e.g., images, articles, text or other content) in various repositories that is similar to (or the same as) a content item identified by the location resource.

The altered message may be sent through a messaging application, e.g., e-mail program, Multi-Media Message Service (MMS), or Short Message Service (SMS). The messaging application can create separate messages for the recipients that do not have access to the location resource and provide an alternate location resource for the recipients without access to the location resource. While the present disclosure is not necessarily limited to such applications, various aspects of the disclosure may be appreciated through a discussion of various examples using this context.

A location resource is a network resource that can be located on another server. The location resource can point to a computing resource outside of a remote client computer. For example, the location resource can be a hyperlink that directs a user to an external server. The external server can have the content item and provide the content item to the user. The location resource may be an address to access the resource (e.g., a content item). A common form of location resource is a hyperlink.

With the advent of permission-based access control to hyperlinks, a recipient of a message may not have the same access permission for the hyperlink as the sender of the message. Furthermore, each recipient may not have the same access permission as other recipients. Thus, it may be advantageous for a sender to know which recipient will have access to the hyperlink before the message is sent. It may also be advantageous for a sender to know if there is an alternate hyperlink for the recipient.

An example of a hyperlink is a Uniform Resource Locator (URL). A URL is a string of characters used to identify or name a resource on a network, such as the Internet. A common way to identify a piece of content available on a computer network such as the Internet is through an addressing scheme including a protocol identifier such as "http", a physical server address such as "domain.com," a file system address such as "root/sub-level" and a file name such as "mypage.html" such that the combined URL appears as "http://domain.tld/root/sub-level/mypage.html" (referring to the electronic document "mypage.html"). Further, many pieces of content included in a Web page, such as graphical images, may each be associated with and retrieved through a respective URL.

Activating a hyperlink in content in a content browser generally causes content referenced by the hyperlink to be retrieved and displayed in the client application. In some circumstances, activating the hyperlink can result in launching a new client application (e.g., a word processor application) that can display or otherwise render the referenced content. Of note, hyperlinked content is not limited to textual content. For instance, hyperlinked content may include multimedia elements or even files selected for download. Further, some advanced Web applications utilize hyperlinks to initiate commands in a backend computing system such as initiation of a database query or submission of a form.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
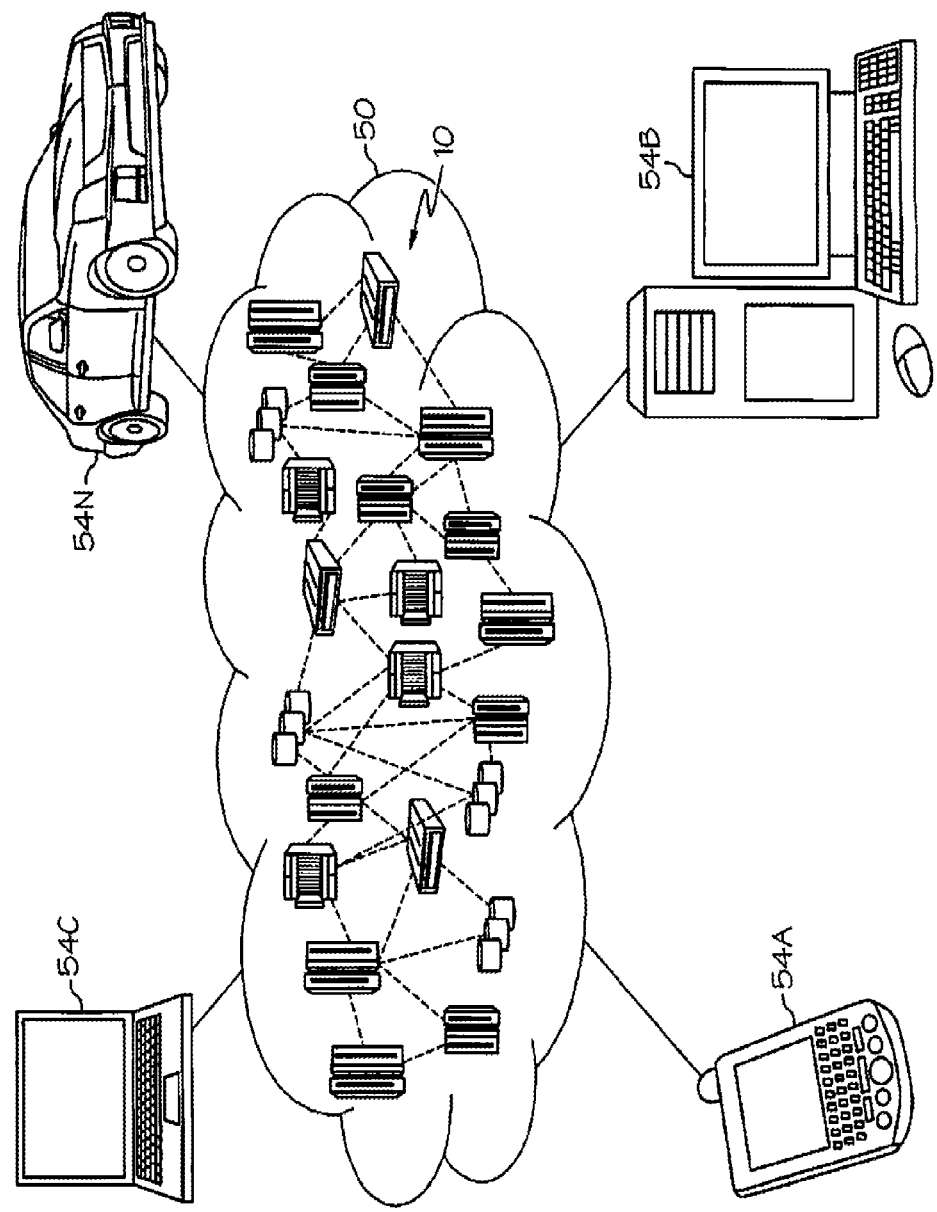
FIG. 2 illustrates a cloud computing environment, according to various embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 3:
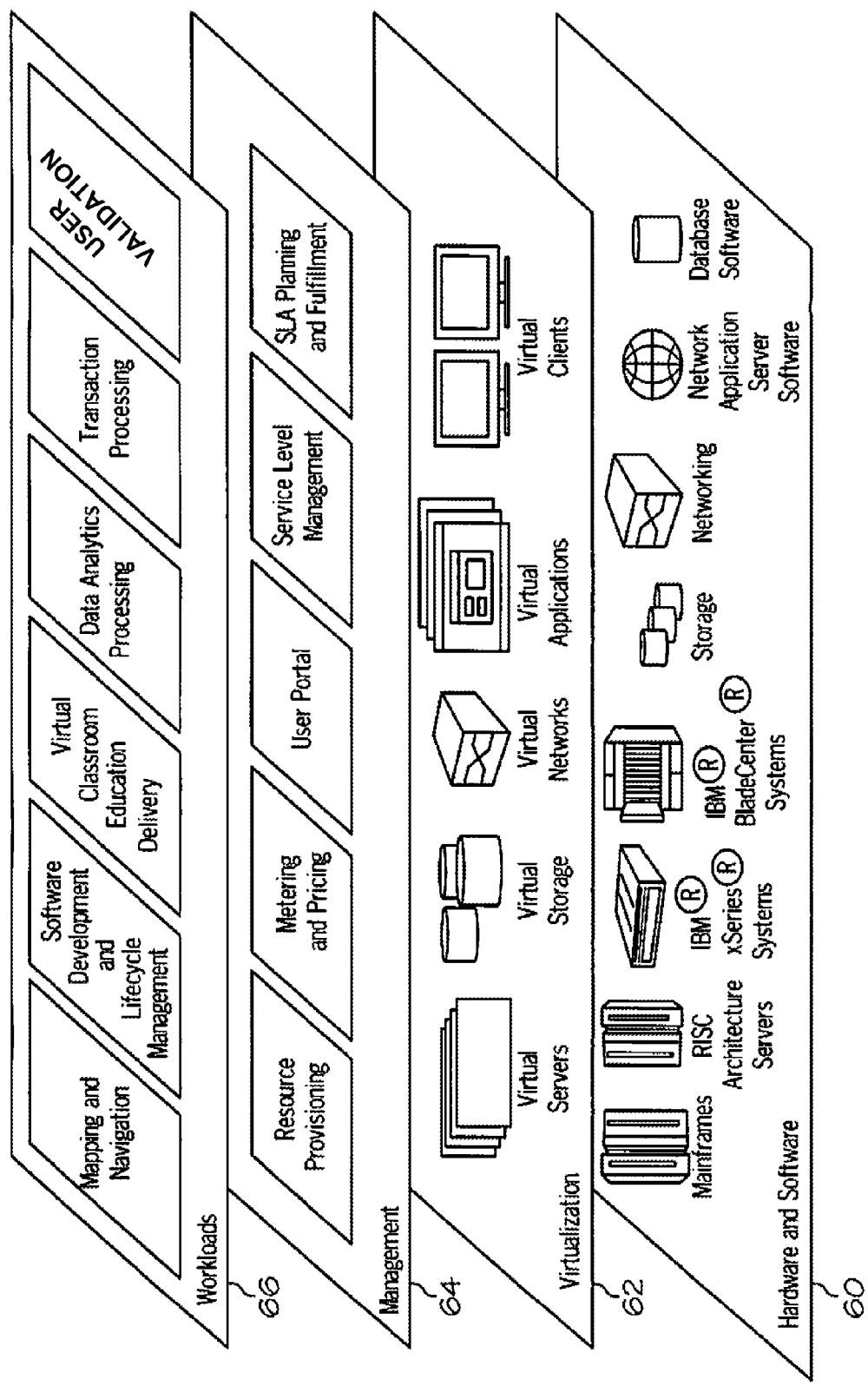
FIG. 3 illustrates a set of functional abstraction layers provided by the cloud computing environment, according to various embodiments.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and user validation to virtual machines.

In various embodiments, the term distributed computing environment refers to the cloud computing environment 50 in FIG. 2. The term compute node may refer to the cloud computing node 10 in FIG. 1.

Figure 4:
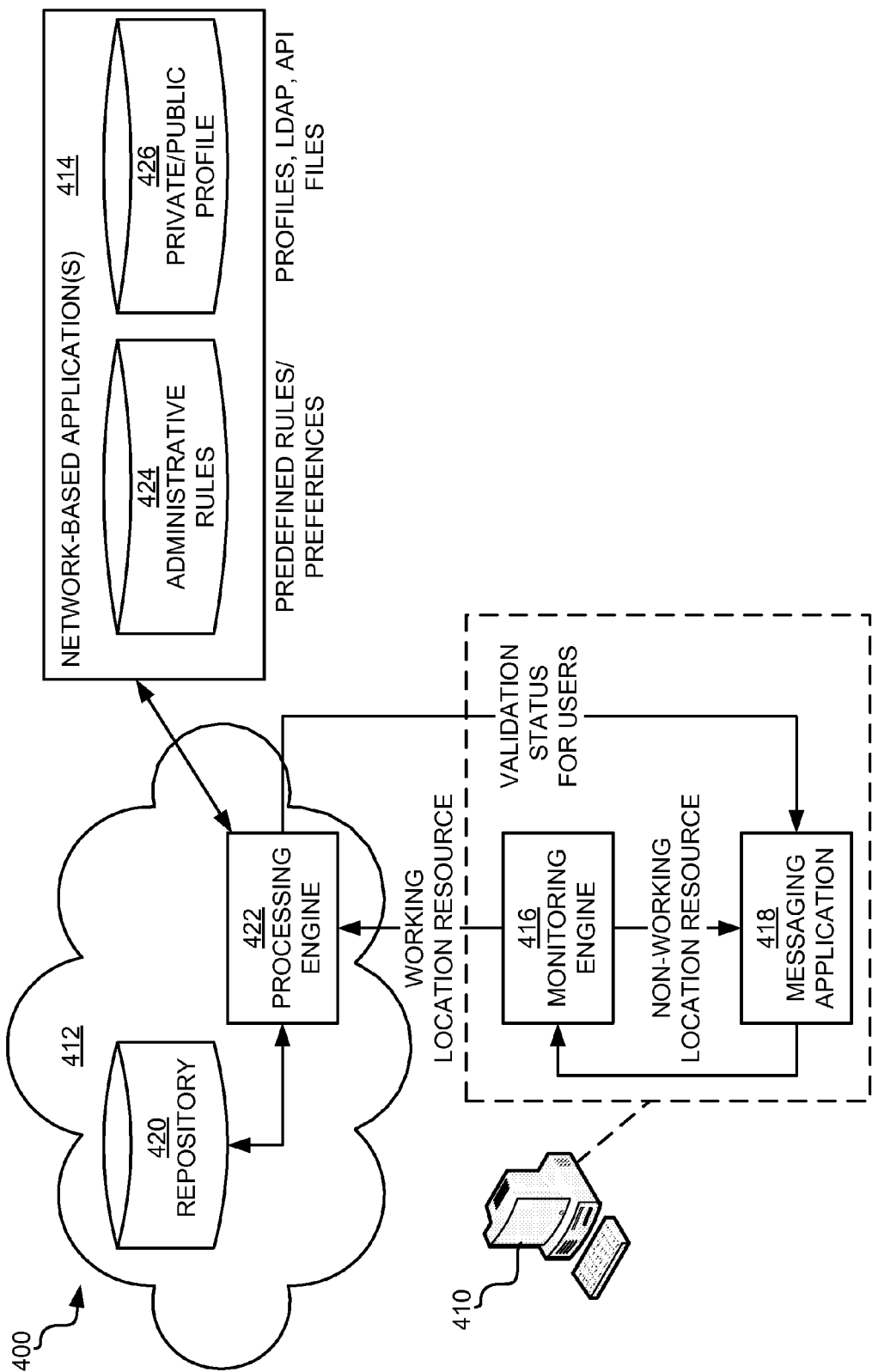
FIG. 4 illustrates a block diagram of a system for validating access permission of location resources for recipients of a message, according to various embodiments.

FIG. 4 illustrates a block diagram of a system 400 for validating access permission of location resources for recipients of a message, according to various embodiments. The system 400 can include a remote computing system 410, a cloud-based computing system 412, and one or more network-based applications 414.

The remote computing system 410 can have a messaging application 418 that creates a message. A sender may use the messaging application on the remove computing system to send a message to one or more recipients. The message may include an embedded location resource. The location resource refers to a network resource accessed by the remote computing system but external to the remote computing system. The location resource can indicate a path to the network resource, e.g., a hyperlink, a file server path, or a Uniform Resource Locator (URL). The cloud-based computing system 412 can validate the embedded location resource for the recipient. Each recipient of the message has a user profile. The user profile contains one or more identifying factors, which are factors that indicate an identity of an individual associated with the user profile. The cloud-based computing system can further validate the access by querying information regarding access permission of the user profile associated with the recipient to the embedded location resource.

If there is no access permission data, then the cloud-based computing system can request the access permission data for the recipient from a network-based application 414 through an Application Programming Interface (API). The network-based application 414 may be external to the cloud-based computing system 412. Once the recipient is found in the cloud-based computing system 412, then the cloud-based computing system 412 communicates the access permission to the remote computing system 410 where it is conveyed to the sender.

The request to validate an embedded location resource originates at the remote computing system 410. The remote computing system 410 is a device that performs computing operations and may run the messaging application 418 either locally or part of local instance of a cloud-based computing system 412. The remote computing system 410 can be a mobile phone, a laptop computer, or a virtual machine from the cloud-based computing system. The remote computing system 410 can have a messaging application 418 that provides messaging services such as Short Message Service (SMS), Multimedia Message Service (MMS), e-mail, instant messaging, etc.

The remote computing system 410 can include a monitoring engine 416 and a messaging application 418. A sender of the remote computing system 410 interacts with a messaging application 418. The messaging application 418 can have a graphical user interface. The graphical user interface can relay instructions from the user to the messaging application 418. The sender can use the messaging application to create a message to send to one or more recipients. The message includes an embedded location resource. A monitoring engine 416 checks the embedded location resource to ensure that the location resource is working. In various embodiments, the monitoring engine can determine whether a request to a location resource is received. If the location resource is not functional, e.g., where the location resource is broken, then the monitoring engine 416 can communicate to the messaging application 418 that the location resource is non-functional. If the location resource is functional, then the monitoring engine 416 can communicate a request to validate the embedded location resource for each recipient with the cloud-based computing system 412.

According to embodiments, the cloud-based computing system 412 can correspond to the cloud computing environment 50 in FIG. 2. The cloud-based computing system 412 can configured to be a private or public cloud but for enhanced security, the cloud may be private. The cloud-based computing system 412 may contain a repository 420 and a processing engine 422. The processing engine 422 may be hosted on one or more compute nodes, e.g., the compute node 10 described in FIG. 1, within the cloud-based computing system 412. In various embodiments, the processing engine 422 can be located within the cloud-based computing system 412 for purposes of fast access. The processing engine 422 is responsible for receiving the request to validate the embedded location resource. The processing engine 422 can manage various validation functions. For example, the processing engine 422 can query the repository 420 for the embedded location resource information and the recipient. The repository 420 can be a cloud-based database in a relational format. In various embodiments, the repository 420 can be a high-speed database separate from a cloud-based computing system 412.

For each query, the processing engine 422 can retrieve data regarding access permission for a recipient. If the access permission data is present in the repository 420, the processing engine 422 can communicate the access permission for the recipient to the user interface 418. If the access permission data is not present in the repository, then the processing engine 422 can request for additional access permission data from the network-based application 414 or communicate to the remote computing system 410 that the access to the embedded location resource is not validated.

Consistent with embodiments, the network-based application 414 may be an independent third party application that neither the remote computing system 410 nor the cloud-based computing system 412 can control. In various embodiments, the network-based application 414 can be an external application from the messaging application 418. The network-based application 414 can also refer to an application that is segregated from the cloud-based computing system 412 and the messaging application 418. The network-based application 414 shares a relationship with the embedded location resource. For example, if the embedded location resource is a URL of, https://{webname}.com/photos/johndoe, then the network-based application 414 can check if the recipient has access to John Doe's photos. The network-based application 414 can include an API for {webname}.com. The network-based application 414 can use a variety of methods to determine whether the recipient has access to John Doe's photos. For example, if the a user name for {webname}.com is associated with the recipient, i.e., a common email address, then the API for {webname}.com can readily determine access permission.

If there is no username for {webname}.com, then the API may use a given name such as "Jane Doe" to determine if a user of {webname}.com that shares the name "Jane Doe" and that the user "Jane Doe" has access John Doe's photos. The network-based application 414 may use various administrative rules 424 and a private/public profile 426 to help identify the recipient. The administrative rules 424 may be a collection of predefined rules or user preferences. For example, if access permission to John Doe's photos are queried, then the network-based application 414 will return all of the users that are friends with John Doe. The private/public profile 426 can contain information unique to a user. For example, Jane Doe may be able to have her {webname}.com public profile accessed to determine whether there is a name associated with the user profile but not her private profile which includes a telephone number.

In various embodiments, the network-based application 414 may not be configured for an external API. If the processing engine 422 does not have communication with the network-based application 414 or cannot validate the access permission, e.g., due to insufficient access permission data, then the processing engine 422 may communicate the lack of communication with the remote computing system 410.

Once the network-based application 414 determines that there is access permission data associated with the recipient, then the processing engine 422 can update the repository with the updated access permission data. In various embodiments, the processing engine 422 can communicate the new access permission data to the remote computing system 410. If the recipient does not have access permission to the location resource, then the processing engine 422 may return an alternate location resource. The alternate location resource is a location resource that is able to be accessed by a recipient. A recipient may not have access permission to access one location resource, e.g., because the recipient is not friends with a sender. The recipient may have access to the alternate location resource, e.g., because the content of the location resource and alternate location resource has identical content and the recipient is friends with the alternate location resource owner. In various embodiments, the alternate location resource is provided to the messaging application 418 in response to the recipient not having access permission for the location resource. The alternate location resource is described further herein.

Figure 5:
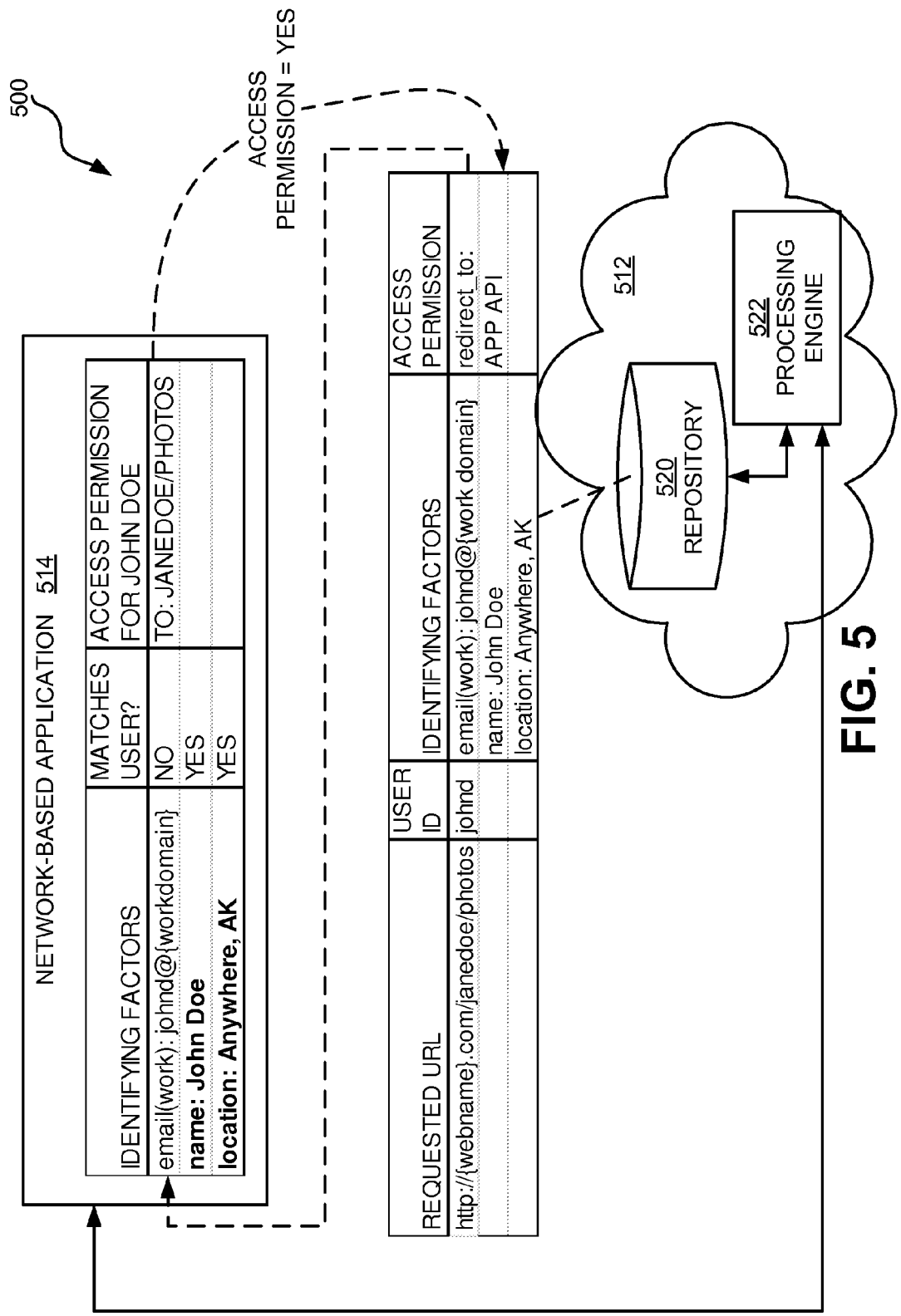
FIG. 5 illustrates a block diagram of a system describing the interaction between the cloud-based computing system and the network-based application, according to various embodiments.

FIG. 5 illustrates a block diagram of a system 500 describing the interaction between the cloud-based computing system and the network-based application, according to various embodiments. Elements in system 500 may correspond to elements in FIG. 4. For example, the repository 520 corresponds to the repository 420 in FIG. 4, the cloud-based computing system 512 corresponds to cloud-based computing system 412, the network-based application 514 corresponds to network-based application 414, and the processing engine 522 corresponds to processing engine 422. System 500 may describe an example of the management of access permission data by the processing engine 522.

The repository 520 may contain structured information in a relational database element, such as a table. In this example, the table contains a requested URL, i.e., a location resource, to Jane Doe's photos on {webname}.com. The recipient is identified by the user identification(ID)/user profile used by the messaging application. Identifying factors of the recipient, such as the work email, name, and location are noted. However, for the access permission data, the field is incomplete and redirected to the {webname}.com API.

The processing engine 522 may note the absence of the access permission data of the recipient in the repository 520. The processing engine 522 may follow the redirect to the {webname}.com API, e.g. 514. If the recipient johnd is in an office setting but does not have his work email, johnd@{work domain}, associated with his {webname}.com username, then the {webname}.com API may also receive identifying factors from the processing engine 522. The two identifying factors, that the recipient's name is John Doe, and that his location is Anywhere, Alaska, may be used by the {webname}.com API to match to a user in the {webname}.com database. The {webname}.com API may be further configured to check to see if the matched user has access to user Jane Doe's photos.

Assuming that the matched user exists, then the access permission data for the user profile/recipient is communicated to the processing engine 522. The processing engine 522 updates the information in the repository 520 and communicates the access permission to a remote computing system. Each API from network-based applications 514 may function in a different manner. In various embodiments, a network-based application 514 may not allow queries into whether a recipient is an authorized user without credentials.

Figure 6:
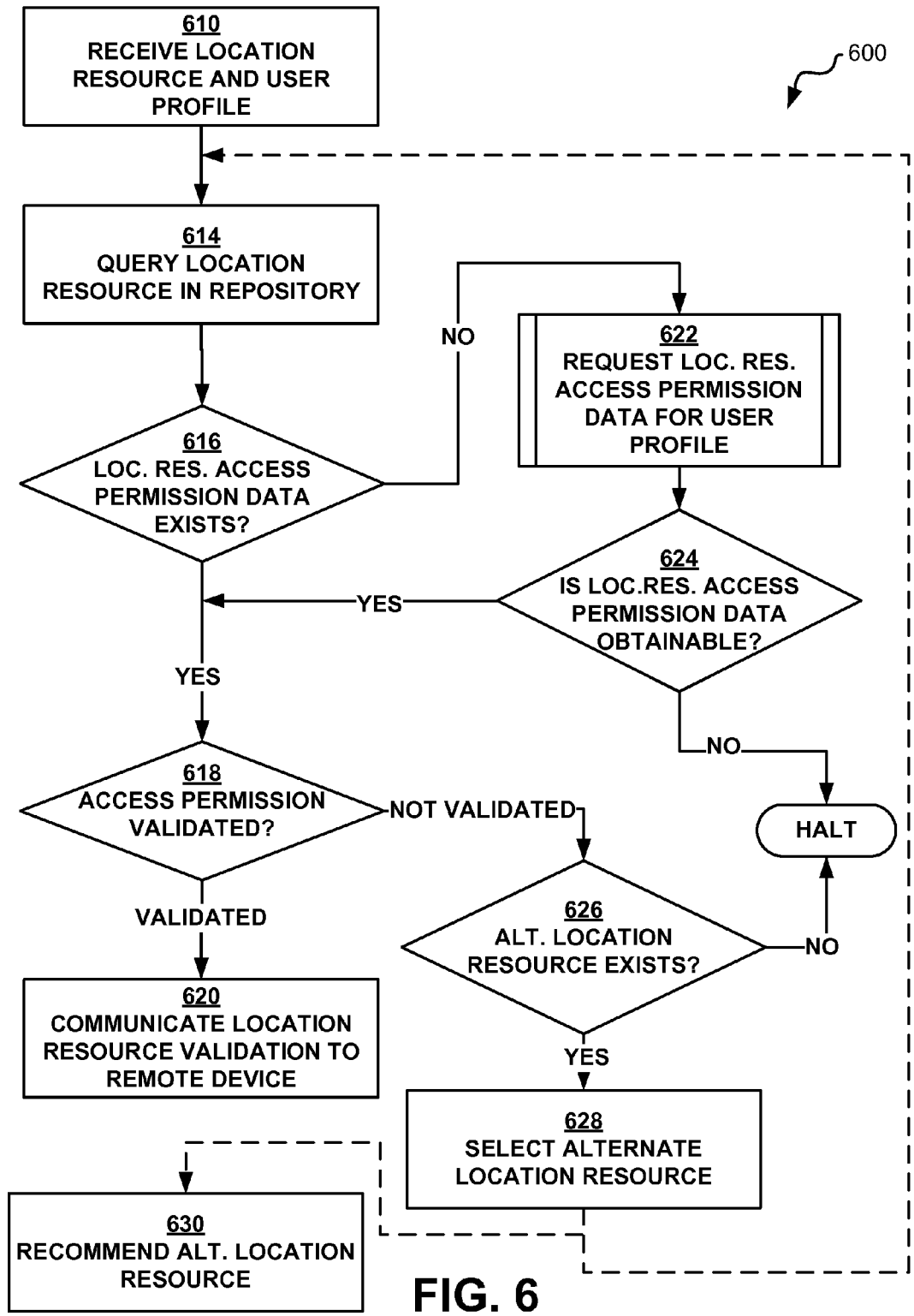
FIG. 6 illustrates a flowchart of a method of validating a location resource for a user profile associated with a recipient, according to various embodiments.

FIG. 6 illustrates a flowchart of a method 600 of validating a location resource for a user profile associated with a recipient, according to various embodiments. The method 600 may be for a processing engine on a cloud-based computing system such as the processing engine 422 described in FIG. 4. The processing engine receives a validation request from a messaging application, e.g., email, to validate a recipient. The processing engine validates the recipient within the cloud-based computing system and returns a validation to the messaging application on a remote computing system. The method 600 begins at operation 610.

In operation 610, the processing engine receives a location resource and a user profile associated with the recipient. The location resource can indicate the location of a resource of a computer system resource. For example, a URL indicates the network address to access a webpage on a server. The user profile is a compilation of identifying factors associated with a particular recipient of a message validation system. Once the location resource and the user profile are received, then the method 600 continues to operation 614.

In operation 614, the processing engine queries a location resource in a repository. The repository is located within the cloud-based computing system and may be a high-speed storage device. In the repository, the location resource is identified and along with multiple identification factors. Access permission data may also be associated with the location resource in the repository. Once queried, then the method 600 continues to operation 616.

In operation 616, the processing engine determines whether the location resource access permission data exists. The location resource access permission data refers to the presence of access permission for the location resource. The access permission data refers to the presence of any data and not necessarily whether a user profile has access permission for the location resource. For example, the repository may not have access permission data associated with the location resource, which would indicate that the processing engine has insufficient data on whether the recipient has access permission to the location resource. Insufficient data may be different than not having access permission to the location resource, according to various embodiments. If the location resource access permission data does not exist, i.e., a non-existence of access permission data, then the method 600 continues to operation 622. If the location resource access permission data exists, then the method 600 continues to operation 618.

In operation 622, the processing engine can obtain the location resource access permission data for the user profile. The processing engine can obtain the location resource access permission data by requesting the location resource access permission data from a network-based application. The application may be able to obtain access permission data for a user profile and be described further herein. Once the processing engine requests location resource access permission data, then the method 600 continues to operation 624.

In operation 624, the processing engine can determine if the access permission data for the user profile is obtainable. The access permission data may not be obtainable if there is no communication with the application. The access permission data may not be obtainable if the application does not allow disclosure of user data. For example, if only a friend of a user of the application can access the user's photos, then the application not releasing a list of friends of the user will make the access permission for the user unobtainable. The processing engine can receive the access permission data from the application. The receipt of the access permission data can indicate to the processing engine that it is obtainable. If the location resource access permission data is obtainable, the method 600 continues to operation 618. If the location resource access permission data is not obtainable, then the method 600 halts.

In operation 618, the processing engine determines whether the access permission for the recipient is validated. The access permission is validated whenever the recipient has access to the location resource. The access permission may be found in the repository. If the access permission is not validated, i.e., the recipient does not have access permission to the location resource, then the method 600 continues to operation 626. If the access permission is validated for the location resource, then the method 600 continues to operation 620.

In operation 620, the processing engine communicates the location resource validation to the remote computing system. The remote computing system may receive the location resource validation and communicate the location resource validation to the messaging application. In various embodiments, the messaging application may consolidate the access permissions for the location resource for a plurality of user profiles for the recipients of the message.

In operation 626, the processing engine determines whether an alternate location resource exist. The processing engine may have to search for an alternate whenever the recipient does not have access permission to the location resource. The alternate location resource may have the same or substantially similar content as the location resource. For example, the location resource may be a URL to a shared document. If recipient A does not have access permission to the shared document because the shared document, e.g., a resume, is owned by owner B with no relationship with recipient A, then the processing engine can check for an alternate location resource. The alternate location resource can be the same shared document but accessed on a different URL. The owner of the shared document with the different URL may be owner C who has a relationship with recipient A. Thus, the alternate location resource allows another path to access the shared document.

The alternate location resource may be present in the repository. The alternate location resource may be found while the processing engine is performing background operations. For example, the processing engine can scan multiple external databases/applications for documents with the same filename or metadata. If there is no alternate location resource, then the method 600 halts. If there is an alternate location resource, then the method 600 continues to operation 628. In operation 628, the processing engine selects the alternate location resource. Once the alternate is selected, then the analysis of alternate location resource continues in place of the location resource in operation 614. There may be circumstances where the alternate location resource specified in the repository for a user profile is not actually validated for the user profile.

Alternatively, once selected, the processing engine can recommend an alternate location resource to the remote computing system in operation 630. The recommending of the alternate location resource may also indicate that the location resource is not validated for the user profile. The remote computing system can receive the recommendation and pass the recommendation of the alternate location resource to the messaging application.

Figure 7:
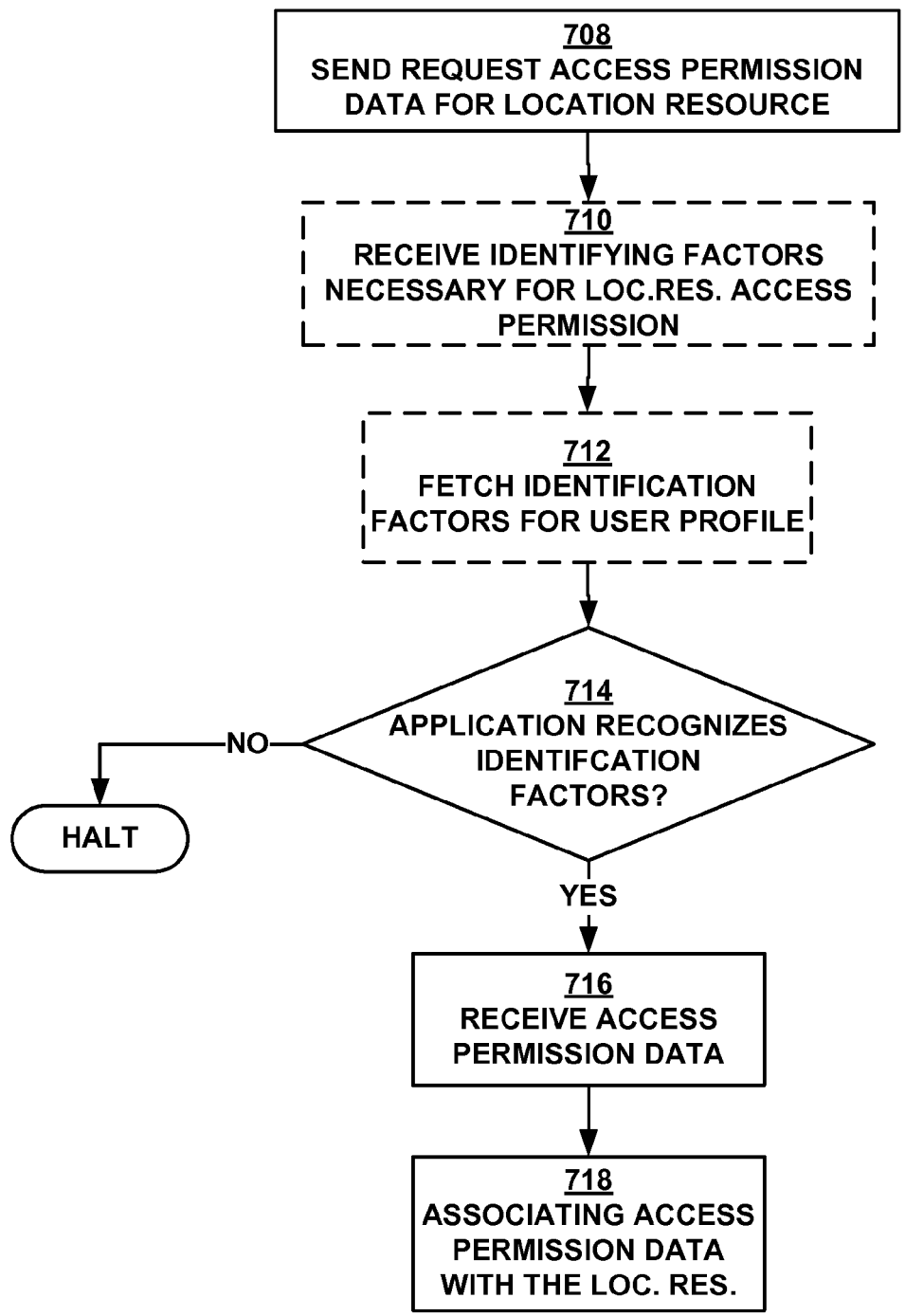
FIG. 7 illustrates a flowchart of a method for requesting access permission data for a user profile accessing a location resource, according to various embodiments.

FIG. 7 illustrates a flowchart of a method 700 for requesting access permission data for a user profile accessing a location resource, according to various embodiments. The method 700 corresponds to operation 622 from FIG. 6. In various embodiments, the method 700 concerns obtaining access permission data or requesting the access permission data. The method 700 begins at operation 708.

In operation 708, the processing engine can send a request for access permission data for the location resource to a network-based application. The application may be accessible via the cloud-based computing system. The network-based application may also be a separate database. Once the request is sent to the network-based application, then the application may process the request for the user profile. The method 700 continues to operation 710.

In operation 710, the processing engine can receive identification factors necessary for the location resource access permission. The identification factors may identify the user to the network-based application. Examples of identification factors include a user name, an email address, a location, a name, a photo, key, or a combination thereof. In various embodiments, the identification factors may be accessible to the application API without credentials for the recipient. In various embodiments, the identification factors are sent along with the request for access permission data in operation 708. Thus, operation 710 and 712 may be considered optional. Once the identification factors necessary are received by the processing engine, then the method 700 continues to operation 712.

In operation 712, the processing engine can fetch the necessary identification factors for the user profile from the repository. The identification factors can be stored in the repository and associated with the user profile. Once the identification factors are fetched, then the method 700 can continue to operation 714.

In operation 714, the processing engine determines whether the application recognizes the identification factors. The external application may not recognize the identification factors if the processing engine does not receive an answer for the request in operation 708. In various embodiments, the network-based application may not provide permissions to queries regarding access permission data.

The external application may not recognize the identification factors if the identification factors are not formatted for the application. The network-based application may only recognize identification factors in a particular format. For example, if a name is transmitted as John H. Doe but the format for the API is Doe, John H. then the application may not recognize the identification factor. If the application does not recognize the identification factor, then the method 700 halts. If the application recognizes the identification factors, then the method 700 continues to operation 716.

In operation 716, the processing engine can receive the access permission data from the application. Once received, then the method 700 continues to operation 718. In operation 718, the processing engine can associate the access permission data with the location resource.

Figure 8:
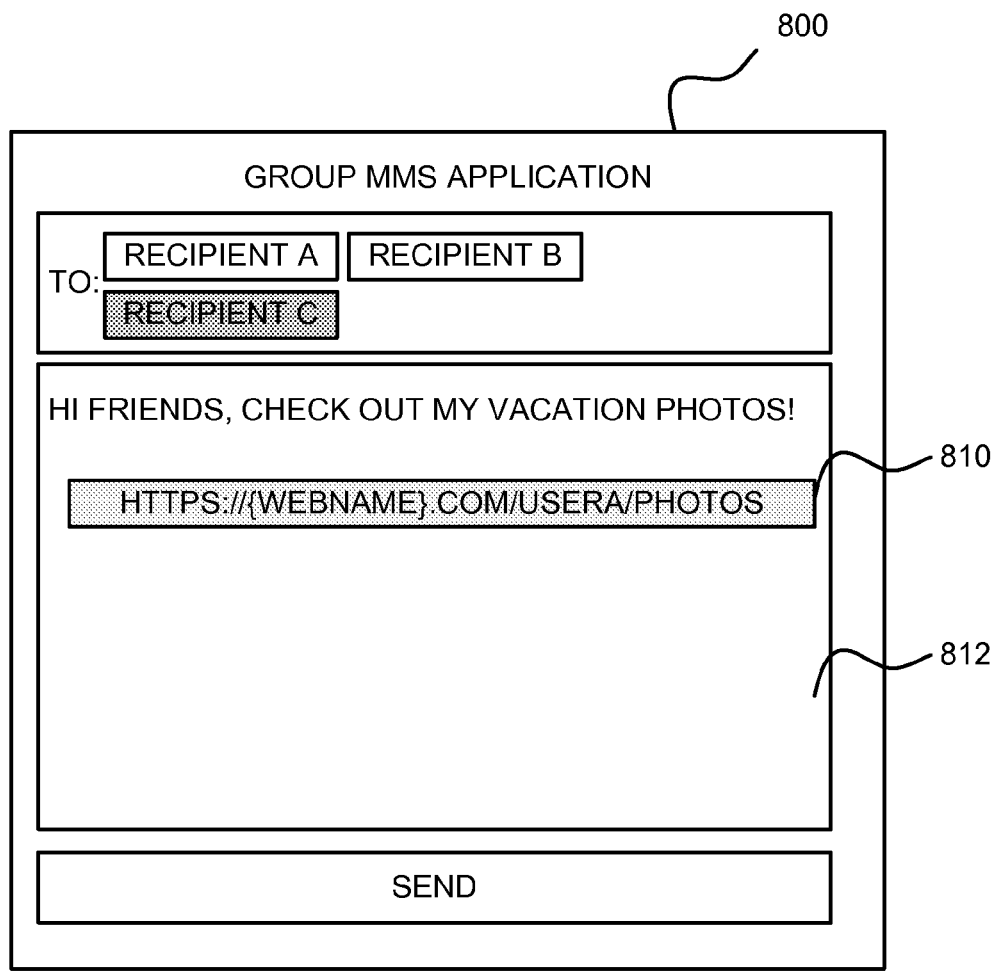
FIG. 8 illustrates a graphical user interface for a messaging application, according to various embodiments.

FIG. 8 illustrates a graphical user interface for a messaging application, according to various embodiments. The messaging application can be a Multimedia Message Service (MMS) application 800. The graphical user interface can communicate the validation determined in FIG. 6 for each recipient. In a group MMS message 812 to recipient A, recipient B, and recipient C, the sender posts a URL 810. The URL 810 can be validated by sending the URL 810 and the user profiles for the recipients to the processing engine in the cloud-based computing system. The processing engine can validate each recipient for access permission to the URL 810.

As a visual communication, the MMS application 800 can indicate the status of the URL by color to indicate a status. Each color may indicate a proportion of recipients that have access to the location resource. For example, a red URL 810 can indicate that fewer than 25% of the recipients will have access permission to the URL 810, a yellow URL 810 can indicate that fewer than 50% of the recipients will have access permission, and a green URL 810 can indicate that fewer than 75% of the recipients will have access permission.

The MMS application 800 can also indicate the access permission of each recipient. For example, the processing engine can validate access for recipient A and recipient B, but not recipient C. The access permission of recipient C can be indicated visually by highlighting the recipient in the MMS application 800 with a different color. For example, when a recipient does not have access permission for a hyperlink, then the sender of the message may need to distinguish which recipient does not have access so that the sender can make special arrangements to provide the content of the hyperlink to the recipient. By having visual cues for the recipients that have or do not have access permission to the hyperlink, the sender can more easily make the determination.

In various embodiments, the MMS application 800 can also propose an alternate location resource. For example, if recipient C cannot access user A's photos because recipient C does not have access permission, then the processing engine running on the back-end can search various repositories to find photos featuring user A and recommend the photos in a certain repository that recipient C can access. The processing engine can determine an alternate location resource (e.g., a URL) for the recommended photos in the repository and refer recipient C to the alternate location resource.

Figure 9:
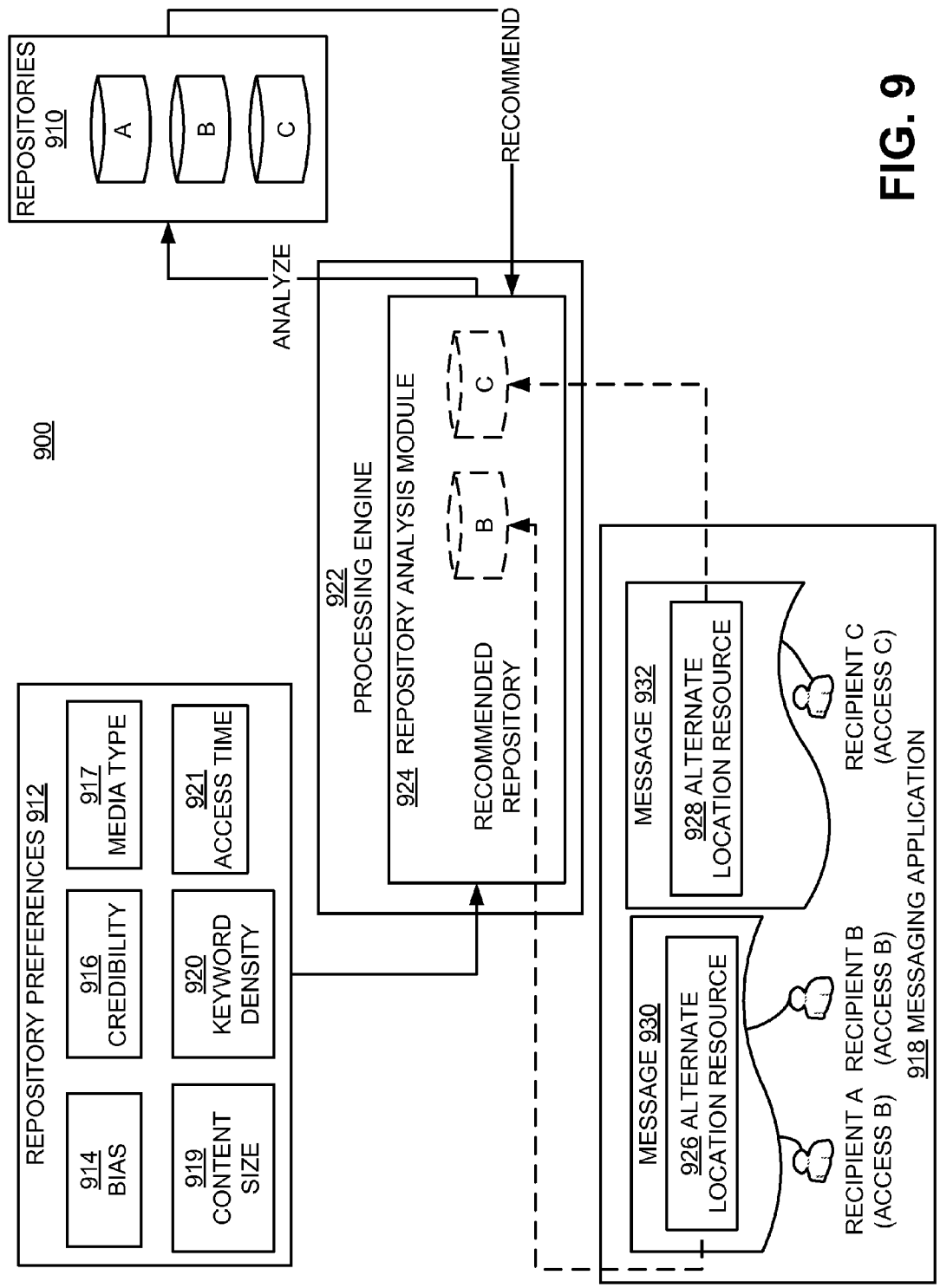
FIG. 9 illustrates a block diagram of an alternate location resource system, according to various embodiments.

FIG. 9 illustrates a block diagram of an alternate location resource system 900, according to various embodiments. The alternate location resource system 900 can include a messaging application 918. A sender can use a messaging application 918 to send a message containing a link (e.g., a link to a content item on a remote server) to a recipient. If the recipient does not have access permission to the content item via the link, then a processing engine 922 may be configured to recommend an alternate location resource to the recipient via the messaging application 918. The messaging application 918 may further send different alternate location resources to different recipients (with each recipient being associated with a user profile).

The alternate location resource system 900 can include some of the components illustrated in system 400 of FIG. 4. For example, the cloud-based processing engine 422 in FIG. 4 can correspond to the processing engine 922. The messaging application 918 can correspond to the messaging application 418 in FIG. 4. The alternate location resource system 900 may also include different aspects, such as various repositories 910 that the processing engine 922 may access and search to find content that matches content that is not directly accessible by an intended recipient.

The processing engine 922 can be configured to search various repositories for content items similar to the content within the original message. Either the sender or recipient of the message can indicate a preferred/recommended repository (i.e., the repository that is searched for the content item first) via one or more repository preferences. The processing engine 922 can query the content item from the recommended repository. In various embodiments, if a content item is found in both the preferred/recommended repository and another repository, then the content item in the preferred/recommended repository will be recommended. In various embodiments, the content item may just be searched in the recommended repository and exclude other repositories.

The processing engine 922 can include a repository analysis module 924. The repository analysis module 924 may recommend alternate location resources (corresponding to a repository 910) to the messaging application 918. The recommendation of an alternate location resource can be provided to a recipient by the messaging application 918. The repositories 910 can host the content item and the alternate location resource can be a link to the content item within the repository 910. The recommendation can be based on content matching or, for example, selecting between two repositories that both host the same content item.

In various embodiments, the content item may be part of a larger story or event that is commented on multiple news websites, social media websites, or blogs (i.e., repositories). The repository preference 912 can allow the processing engine 922 to narrow the plurality of repositories to the repositories that the recipient or sender prefers.

The repositories 910 may be recommended based on one or more repository preferences 912. The repository preferences 912 can be the preferences of the sender to recommend certain repositories over other repositories. The repository preferences 912 can concern the content of the repository or the properties of the repository. For example, the repositories 910 may include bias 914, credibility 916, media type 917, content size 919, keyword density 920, or access time 921.

The repository preferences 912 may be measured objectively or subjectively. For example, a bias 914 may measure the degree of individual or political bias of a content item be more subjective and depend on a user input. The system can be configured to determine bias 914 by utilizing keyword density 920 on the content item for polarizing language to infer some form of bias 914 of the content. The bias 914 can be set by the sender to select content that shares the sender's bias. In various embodiments, the bias 914 can also be measured in terms of the recipient receiving the message. For example, a recipient may have indicated that the recipient prefers news of a particular bias 914. A media type 917 (e.g., a video file, an audio file, a document) can be less subjective since the media type 917 of a repository can be readily classified into a media type by a computer system without user input to distinguish between various types of files. The media type preference 917 can be set by the sender to take a repository that hosts mostly video files.

The bias 914 may apply to the content aggregated over the repository. For example, if the repository is a news web site, then the news web site may have a particular political bias. The repository analysis module 924 may prefer to have a neutral political bias and avoid repositories with a strong political bias. Each repository in the repositories 910 can be scored using a variety of criteria for bias and stored in temporary storage or associated with the repository in a database.

The credibility 916 may apply to the repository and may be measured objectively or subjectively. For example, a blog repository with web traffic of 200 hits/day may be less credible than a news web site with web traffic of 2 million hits/day. The content size 919 may be determined by an average content size of individual elements (e.g., articles or posts) and may indicate a preference for repositories with short, high-readability content (e.g., social media status updates as opposed to scientific articles). The access time 921 may refer to a preference for a repository that is able to be accessed quickly by the repository analysis module 924. A fast access time can be particularly advantageous in situations where repositories are frequently accessed. For example, a repository that has a load time of 3 minutes may be less preferred over a repository that has a load time of 3 seconds.

The repository analysis module 924 can weight the repository preferences 912 using a weighting function. The weighting function can apply different weights according to the repository preferences 912 to emphasize select repository preferences. For example, if the sender wants to select repositories that have a neutral bias 914 and a high keyword density 920 for the term "cats" (e.g., cat blogs), then the bias 914 and keyword density 920 repository preferences 912 may have a higher weight than media type 917.

The repository analysis module 924 may recommend one or more repositories 910 based on the repository preferences 912. In various embodiments, the repositories 910 may be selected based on an aggregate score. For example, each repository in the repositories 910 may have been scored based on the repository preferences 912. For example, repository B may have a weighted score of 90/100 because of the high instance of keyword "cats". On the other hand, repository A may have a weighted score of 45/100 because the sender prefers a low content size 919 but repository A has a high content size. The repository analysis module 924 may also recommend repositories based on a threshold analysis and recommend the repositories that have a minimum score.

In various embodiments, the repository analysis module 924 can recommend repositories based on the recipient. For example, repository B can be recommended for a recipient A based on the repository preferences 912 and whether the recipient A has access to the repository B. Repository C can be recommended for recipient C concurrent with the recommendation of repository B or as part of a separate operation. In various embodiments, the repository analysis module 924 can create an alternate location resource, e.g., a URL, that links to a content item in the repository. For example, alternate location resource 926 may point to content in repository B and alternate location resource 928 may point to content in repository C. The repository analysis module 924 may recommend the alternate location resources, 926, 928.

The messaging application 918 can receive the recommendations for the alternate location resources 926, 928. The messaging application 918 can be configured to send one or more messages to one or more recipients containing an alternate location resource. For example, message 930 can include an alternate location resource 926, and message 932 can include the alternate location resource 928. In various embodiments, the messaging application 918 can send a single message with a different alternate location resource sent to each recipient.

The message may be sent according to the accessibility of the alternate location resource to the recipient. If a recipient does not have access to an alternate location resource, then the message containing the alternate location resource may not include the recipient. For example, alternate location resource 926 (pointing to repository B) may be accessible to recipient A and recipient B but not recipient C. Therefore, the message 930 containing the alternate location resource 926 may be sent to recipient A and recipient B. If the alternate location resource 928 (pointing to repository C) is accessible to recipient C, then the messaging application 918 can be configured to create a message 932 to provide the alternate location resource 928 to recipient C. In various embodiments, a message can be modified to include the alternate location resources 926, 928. For example, in addition to having a location resource, the message may also contain the alternate location resource 926, and alternate location resource 928. In various embodiments, the location resource may be substituted with alternate location resource 926 or alternate location resource 928.

Figure 10:
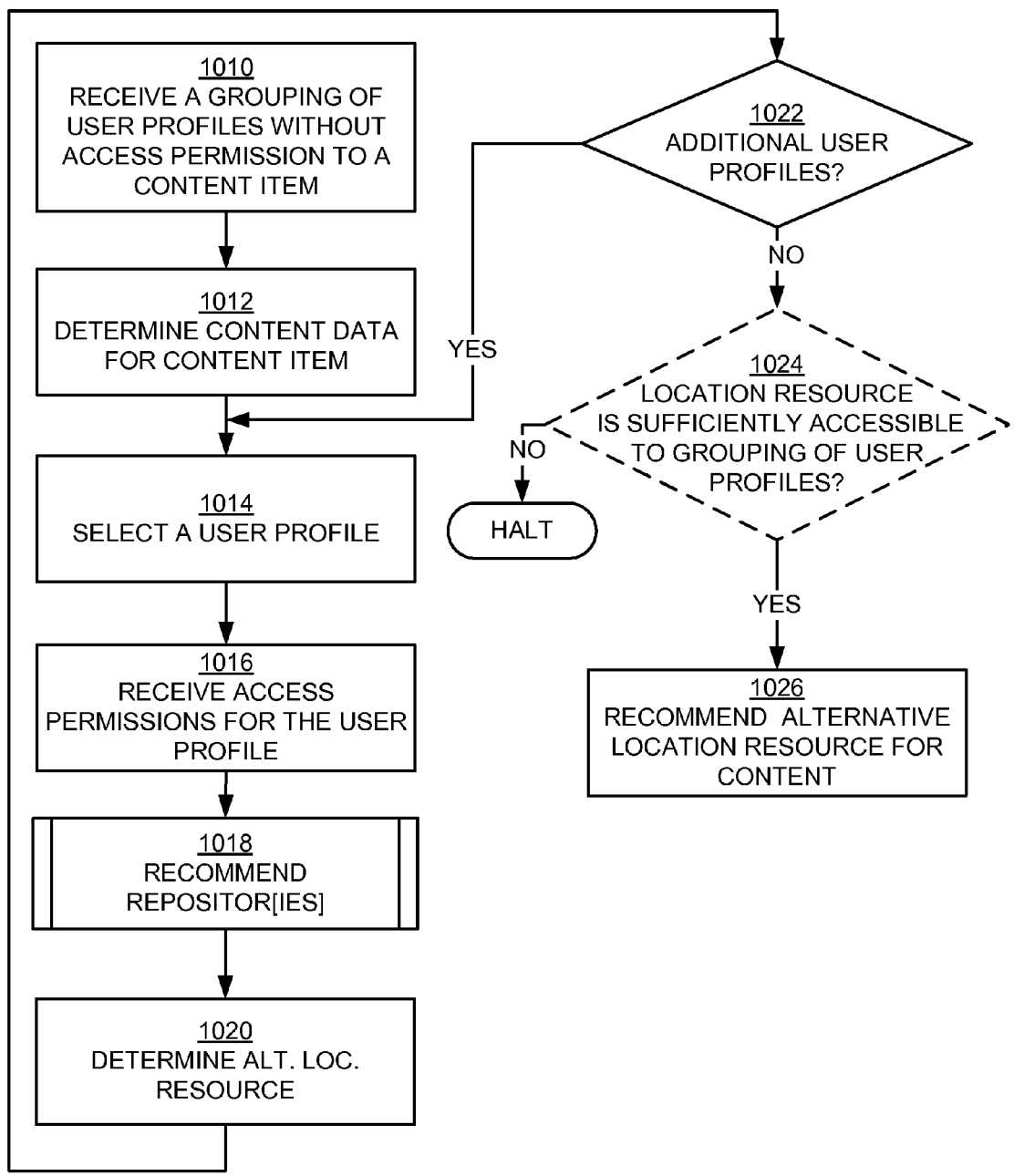
FIG. 10 illustrates a flowchart of a method for recommending an alternate location resource for a group of user profiles.

FIG. 10 illustrates a flowchart of a method 1000 for recommending an alternate location resource for a group of user profiles. As mentioned herein, a user profile can be associated with a recipient. The method 1000 can illustrate operations of a processing engine, more specifically, the repository analysis module. The repository analysis module can recommend alternate location resources for user profiles that do not have access to a location resource (i.e., the original location resource). In various embodiments, the repository analysis module may analyze the repositories for content that is similar to the content of the location resource. The repository analysis module may also select repositories using repository preferences that may indicate the type of content on the repository. Once a repository is selected, then the repository can be recommended to the messaging application. The method 1000 begins at operation 1010.

In operation 1010, the repository analysis module can receive a grouping of user profiles without access permissions to a content item (e.g., which may also be referred to a first content item). In various embodiments, the grouping of user profiles without access permissions may be determined by the processing engine. For example, the processing engine can determine that a grouping of user profiles does not have access permission to a location resource. The location resource may additionally point to a content item. Each recipient without access permission to the location resource may be assembled into a larger listing of user profiles by the repository analysis module. The user profile may refer to a variety of information associated with a user and may be evaluated for access permission. For example, a user profile can include recipients or senders of a message, or users of a system. Once the repository analysis module receives a grouping of user profiles without access permission to the content item, then the method 1000 can continue to operation 1012.

In operation 1012, the repository analysis module can determine content data for the content item. The content item may be an original content item sent by a sender for which the group of user profiles does not have access permissions. The content item may have metadata and content data associated with the content item. The metadata for content items can generally refer to the "facts" about the content item. For example, the metadata can include date written, the author, the source, etc. The content data may refer to the actual content within the content item and can vary based on the content item type. For example, the content data can include the words associated with an article, the values associated with a table, the sound frequencies of a recording, etc. In various embodiments, the term content data as used in this disclosure can include the metadata. Once the repository analysis module determines content data for the content item, then the method 1000 can continue to operation 1014.

Operations 1014 through 1020 may apply to a single user profile without access permission to the content item. A user profile can be selected, and a repository can be recommended for the user profile. In various embodiments, once the repository is recommended for a single user profile, the repository analysis module can evaluate the remaining user profiles in the grouping of user profiles for access to the repository. In some embodiments, the repository can be recommended on the basis of the entire grouping of user profiles without necessarily evaluating each user profile for access permissions. The user profiles can be selected and evaluated sequentially or concurrent with each other.

In operation 1014, the repository analysis module can select a user profile from the grouping of user profiles. The user profile can be selected in a variety of manners. For example, the user profile may be selected based on importance (e.g., whether a recipient is in the "To:" field or the "CC:" field), at random, or alphabetically. Once the user profile is selected, then the method 1000 can continue to operation 1016.

In operation 1016, the repository analysis module can receive access permission for the user profile to a plurality of content items in one or more repositories. The access permission can cover a repository or can cover various content items within the repositories. Each user profile can have access to a variety of repositories. Each repository can each host a plurality of content items that may be similar to the content item identified in operation 1010. The access to the plurality of content items can be determined in stages. For example, the repository analysis module can determine the access permission for the user profile to a specific repository. If the user profile has access to the repository, then the repository analysis module can determine which content items that the user profile has access permissions within the repository. Once the repository analysis module receives the access permission, then the method 1000 can continue to operation 1018.

In operation 1018, the repository analysis module can recommend one or more repositories for the user profile. The repositories can host a second content item that is similar to a first content item in operation 1010. The repositories can be selected based on the similarity of the second content item to the first content item and based on the user profile having access permission to the repositories with the second content item.

The second content item can be similar to the first content item if both share at least part of the metadata or content data. For example, if a first content item is a social media posting on one social network about a "major news event" (i.e., the content) at a particular time (i.e., the metadata), then a second content item may be similar to the first content item if the second content item is on a different social media network but also about the "major news event" at the particular time. The user profile has access to the repositories if the user profile has an access permission. The repository can have numerous sub-repositories. For example, a social network may be a repository and the various user pages within the social network can be sub-repositories. A user profile may also be a follower of a content generator on a social network but not a follower of another content generator within the same social network. Thus, the user profile may not have access to both repositories of the content generator and another content generator. Once the repositories are recommended, then the method 1000 can continue to operation 1020.

In operation 1020, the repository analysis module can determine an alternate location resource for the second content item recommended in operation 1018. The second content item may require the access permission for the repository. The alternate location resource can include the location to the second content item that corresponds to access permissions for a user profile. For example, if the second content item exists in more than one repository, but the user profile only has access permission to one repository, then the repository analysis module can receive an alternate location resource to the repository with access permission. The lack of access permission can correspond to the lack of accessibility. For example, a repository that does not provide access permission for the user profile may not be accessible. In various embodiments, the repository analysis module can determine the path to obtain the second content item. For example, the repository analysis module can determine that a repository exists at a particular server at an IP address and further searches the server for a URL to the content item.

Once the alternate location resource is determined, then the method 1000 can continue to operation 1022. In operation 1022, the repository analysis module can determine if additional user profiles are requested. Operations 1014-1020 can apply for a single user profile that is searching for an alternate location resource for the single user profile. Various aspects of the disclosure can test the alternate location resource for other user profiles besides the single user profile. In various embodiments, a second user profile may be selected and an alternate location resource can be recommended for the second user profile. The method 1000 can continue in an iterative manner until the grouping of user profiles in operation 1010 has been analyzed. In various embodiments, the grouping of user profiles can be analyzed in operations 1014-1022 in parallel. For example, two or more user profiles can be analyzed by the repository analysis module concurrently. If there are no more user profiles to analyze, then the method 1000 can continue to operation 1024.

In operation 1024, the repository analysis module can determine whether the alternate location resource is accessible to any user profile from the grouping of user profiles. Operation 1024 can be considered optional depending on how the grouping of user profiles is analyzed. For example, if the grouping of user profiles is analyzed individually in an iterative manner, then operation 1024 may not apply since each user profile has an alternate location resource associated with the user profile. However, if the grouping of user profiles is analyzed so that the first user profile's determined alternate location resource is used for the remaining user profiles from the grouping of user profiles, then the method 1024 can apply.

A variety of techniques can be employed to determine whether the alternate location resource is accessible to the grouping of user profiles. In various embodiments, the alternate location resource can be accessible to a majority of the grouping of user profiles. For example, if there are 3 user profiles in the grouping of user profiles, and 2 of the user profiles can access the alternate location resource, then the alternate location resource may be considered accessible to the grouping of user profiles. In various embodiments, if only a minority can access the location resource then the alternate location resource may not be recommended to the grouping of user profiles. The alternate location resource may be accessible to the grouping of user profiles by being accessible to a primary/first recipient. For example, if there is one user profile of high importance, such as a manager, within the grouping of user profiles, then the ability of the high importance user profile to access the alternate location resource can influence the accessibility of the alternate location resource. Once the repository analysis module determines whether the alternate location resource is sufficiently accessible to the grouping of user profiles, then the method 1000 can continue to operation 1026. In operation 1026, the repository analysis module can recommend the alternate location resource for the content item. In various embodiments, the recommendation can be in response to the alternate location resource being accessible to the grouping of user profiles. The recommendation may include an identification of the alternate location resource as well as the user profile that is associated with the alternate location resource. The recommendation may be sent to a messaging application.

The messaging application may further parse a message into more than one message. For example, an e-mail application may include an e-mail (i.e., the message) with an embedded URL (i.e., the location resource) sent to 3 recipients. If the first recipient does has access permission for the embedded URL, but the second and third recipient do not, then the repository analysis module can recommend an alternate embedded URL (i.e., the alternate location resource) to the e-mail application. Assuming that the second recipient has access permission for a first alternate embedded URL, and the third recipient has access permission for a second alternate embedded URL, then the e-mail application can create one email with the first, the second, or both alternate embedded URLs. The email application may create separate emails, one email with the first recipient receiving the embedded URL, another email with the second recipient receiving the first alternate embedded URL, and another email with the third recipient receiving the second alternate embedded URL.

Figure 11:
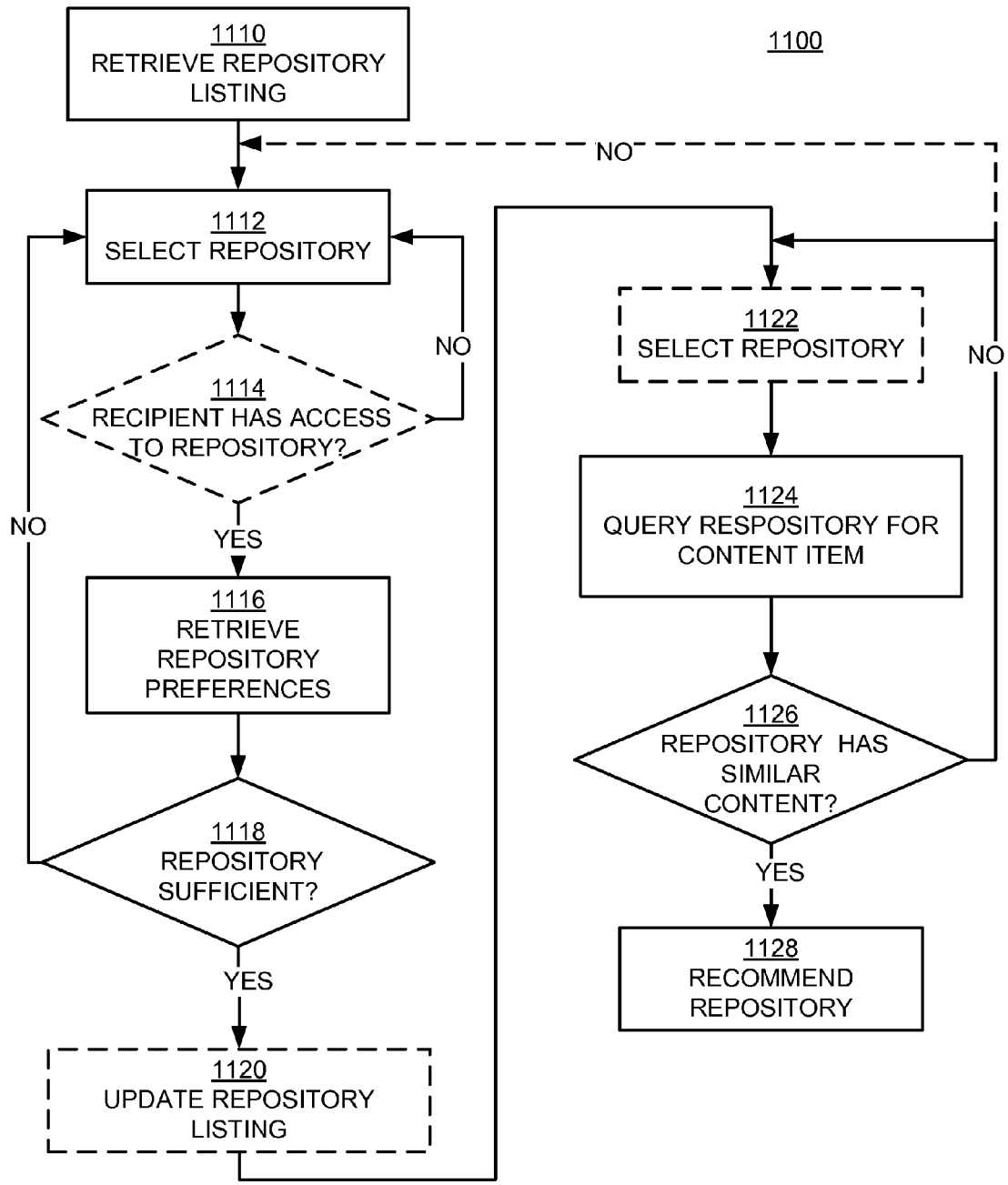
FIG. 11 illustrates a flowchart of a method for recommending a content item within a repository.

FIG. 11 illustrates a flowchart of a method 1100 for recommending a content item within a repository. The method 1100 may correspond to operation 1018 in FIG. 10. The recommending a repository for the repository can include two parts. For example, the retrieval of repositories based on the repository preference for a user profile, and the comparison of the first content item and the second content item.

In operation 1110, the repository analysis module can retrieve a repository listing that references the plurality of repositories. The repository listing can be a listing of all the repositories accessible to the repository analysis module and include the repositories with access permissions for the user profile. The repository listing can be stored to allow easy access to the repository analysis module, including storage within the computing elements of the processing engine. Once the repository listing is retrieved, then the method 1100 can continue to operation 1112.

Operations 1112-1118 can occur in an iterative manner and may be independent from the comparison of the second content item with the first content item. For example, the repository analysis module can cycle through each repository from the repository listing. The repositories can be narrowed to include repositories that meet repository preferences for a user profile (e.g., a sender, recipient, or system preference for certain types of repositories). In various embodiments, a tailored list of repositories can be compared with the first content item to determine if there is sufficient overlap. In various embodiments, the selected repository in operation 1112, if the selected repository is sufficient, can be evaluated for second content items that are similar to the first content item.

In operation 1112, the repository analysis module can select a repository from a plurality of repositories within the repository listing. In various embodiments, the repository can be selected by the repository analysis module based on the access permission of the user profile to the repository. The repository can be selected at random or based on other factors. For example, one repository can be used more frequently than another repository by a recipient or sender as determined by cookies or server history. Then, the more frequently used repository may be utilized before the less frequently used repository.

In operation 1114, the repository analysis module can verify that the user profile has access to the repository. In various embodiments, operation 1114 can be optional and may occur in an aforementioned operation (e.g., operation 1016 in FIG. 10). For example, operation 1110 can involve retrieving only the repositories accessible to the user profile which would make operation 1114 redundant. If the user profile does not have access permission to the repository, or does not have access to the repository, then another repository can be selected.

In operation 1116, the repository analysis module can retrieve repository preferences for the user profile. The repository preferences can be a preference from the user profile for the repository analysis module to select repositories that meets certain criteria. In operation 1118, the repository analysis module can determine whether the repository is sufficient by using the repository preferences. For example, the repository analysis module can apply various weights to the repository preferences. In various embodiments, the weights and values can contribute to a score for the repository preferences. The repository may be sufficient if the score for the repository is within a threshold value. The repository preferences are described further herein. If the repository is sufficient, then the method 1100 can continue to operation 1120. If the repository is not sufficient, then another repository may be evaluated.

In operation 1120, the repository analysis module can update the repository listing with the information regarding whether it is sufficient for a user profile. For example, the repository listing in operation 1010 can also include information regarding whether the repository meets the repository preferences for the user profile. Operation 1120 may be considered optional. For example, there may not be a centralized repository, therefore the repository will need to be sufficient and the sufficient repository will also need to have the correct content. Processing resources may be saved by having a centralized repository listing. Assuming that the repository analysis module uses a centralized repository listing, the repository analysis module can select a repository in operation 1122 from the sufficient repository listing to compare the first content item to a second content item within the repository.

In operation 1124, the repository analysis module can query the repository for the second content item. More specifically, the repository analysis module can query the repository for the first content data (and first metadata) that correspond to the first content item. The first content data can be the terms used for the query. The repository analysis module may return a variety of second content items that share at least some of the first metadata or first content data. In various embodiments, a second content data corresponding to the second content item may be obtained that is different than the first content data. Once queried, then the method 1100 can continue to operation 1126 to evaluate the second content items.

In operation 1126, the repository analysis module can determine whether the repository has similar content to the first content item by comparing the first metadata or first content data of the first content item to the second metadata or the second content data queried from the second content item. In various embodiments, more than one second content item can be compared to the first content item within the repository. The second content item can be similar to the first content item if the metadata or the content data is comparable. For example, if the first content item has a keyword density of 28 for "llamas", then the second content item may have to have a similar keyword density of "llamas" to be considered similar. The similarity may depend on the level. A broad level, e.g., subject, should match more closely, than a narrow level, e.g., sentence structure. For example, if the first content item has a subject matter of "pets", then the second content item should also have a subject matter of "pets" to be considered similar to the first content item. If the second content item has a subject matter of "livestock", then the second content item may not be similar to the first content item.

The repository analysis module can require a minimum number of second content items within the repository. For example, if the minimum number of second content items is 5 and there are 6 second content items that are similar to the first content item, then the method 1100 can continue to operation 1128. If there are 4 second content items in the repository that are similar to the first content item, then the method 1100 can continue to either operation 1122 or 1112 depending on whether a centralized repository listing is used. In operation 1128, the repository analysis module can recommend the repository in response to the second content data being similar to the first content data from the first content item. The recommended repository can be further used by the repository analysis module to recommend an alternate location resource to a user profile.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a computing node in a distributed computing environment and from a messaging application on a remote client computer, a first message to a plurality of recipients and having a location resource to a first content item outside of the remote client computer;
   determining that a grouping of user profiles from the plurality of recipients do not have access permission to the location resource;
   communicating, visually using the messaging application, which recipients do not have access permission by color coding a user profile address for each recipient in an address bar of the messaging application;
   identifying a first content data for the first content item;
   selecting a first user profile from the grouping of user profiles;
   receiving access permission data for the first user profile to a first plurality of content items including a second content item;
   recommending one or more repositories for the first user profile based on a similarity between the first content item to the second content item within the one or more repositories, wherein the similarity is determined by the second content item sharing at least part of the first content data with the first content item; and
   determining a first alternate location resource, accessible to at least the first user profile, for the second content item within the one or more repositories.

2. The method of claim 1, further comprising:
   selecting a second user profile from the grouping of user profiles;
   receiving access permission data for the second user profile to a second plurality of content items including a third content item;
   recommending one or more repositories for the second user profile based on a similarity between the first content item to the third content item within the one or more repositories; and
   determining a second alternate location resource, accessible to at least the second user profile, for the third content item within the one or more repositories.

3. The method of claim 2, further comprising:
   recommending the first alternate location resource for the first user profile and the second alternate location resource for the second user profile.

4. The method of claim 3, further comprising:
   receiving a recommendation for the first alternate location resource and the second alternate location resource;
   creating a second message, based off of the first message, to a first recipient corresponding to the first user profile with the first alternate location resource and a third message, based off of the first message, to the a second recipient corresponding to the second user profile with the second alternate location resource.

5. The method of claim 3, further comprising:
   receiving a recommendation for the first alternate location resource and the second alternate location resource; and
   adding the first alternate location resource and the second alternate location resource to the first message.

6. The method of claim 1, wherein the recommending one or more repositories includes:
   retrieving repository preferences for the first user profile; and
   selecting the repository from the plurality of repositories based upon the repository preferences.

7. The method of claim 6, further comprising:
   querying the repository for the first content data;
   comparing the first content data of the first content item to a second content data corresponding to the second content item; and
   recommending the repository in response to the second content data being similar to the first content data of the first content item.

8. The method of claim 1, wherein determining the first alternate location resource includes:
   determining whether the first alternate location resource is accessible to the grouping of user profiles; and
   recommending the first alternate location resource for the second content item in response to the first alternate location resource being accessible to the grouping of user profiles.

9. The method of claim 8, wherein the first alternate location resource is selected in response to determining that the first alternate resource is accessible to a majority of the grouping of user profiles.

10. The method of claim 8, wherein the first alternate location resource is accessible to the grouping of user profiles by being accessible to the first user profile.

11. The method of claim 1, wherein the location resource is a Uniform Resource Locator (URL) and wherein the messaging application visually indicates that fewer than half of the recipients have access permission to the URL by coloring the URL.

12. The method of claim 1, wherein determining that the grouping of user profiles from the plurality of recipients do not have access permission to the location resource comprises:
   determining whether access permission data for the location resource exists in one of the one or more the repositories;
   requesting, from a network-based application and in response to the existence of the access permission data in the one of the one or more repositories, access permission data for the location resource; and
   receiving, from the one of the one or more repositories, denial of access permission to the one of the one or more repositories.

13. A system, comprising:
a distributed computing environment that includes:
   one or more repositories; and
   a processing engine, hosted by a computing node in the distributed computing environment, wherein the processing engine includes a processor configured to:
      receive, from a messaging application to a plurality of recipients, a grouping of user profiles from the plurality of recipients that do not have access permission to a location resource contained within a message and for a first content item,
      communicate, visually using the messaging application, which recipients do not have access permission by color coding a user profile address for each recipient in an address bar of the messaging application,
      determine a first content data for the first content item,
      select a first user profile from the grouping of user profiles,
      receive access permission data for the first user profile to a first plurality of content items including a second content item;
      recommend one or more repositories for the first user profile based on a similarity between the first content item to the second content item within the one or more repositories, wherein the similarity is determined by the second content item sharing at least part of the first content data with the first content item; and
      determine a first alternate location resource, accessible to at least the first user profile, for the second content item within the one or more repositories.

14. The system of claim 13, wherein the processing engine is further configured to:
   select a second user profile from the grouping of user profiles;
   receive access permission data for the second user profile to a second plurality of content items including a third content item;
   recommend one or more repositories for the second user profile based on a similarity between the first content item to the third content item within the one or more repositories; and
   determine a second alternate location resource, accessible to at least the second user profile, for the third content item within the one or more repositories.

15. The system of claim 14, wherein the processing engine is further configured to:
   recommend the first alternate location resource for the first user profile and the second alternate location resource for the second user profile.

16. The system of claim 15, wherein the messaging application is further configured to:
   receive a recommendation for the first alternate location resource and the second alternate location resource;
   create a second message, based off of the first message, to a first recipient corresponding to the first user profile with the first alternate location resource and a third message, based off of a first message, to the a second recipient corresponding to the second user profile with the second alternate location resource.

17. The system of claim 13, wherein the processing engine is configured to recommend one or more repositories by:
   retrieving repository preferences for the first user profile; and
   selecting the repository from the plurality of repositories based upon the repository preferences.

18. A computer program product comprising a computer readable storage device having a computer readable program stored therein, wherein the computer readable program, when executed on a computing device, causes the computing device to:
   receive, by a computing node in a distributed computing environment and from a messaging application on a remote client computer, a first message to a plurality of recipients and having a location resource to a first content item outside of the remote client computer;
   determine that a grouping of user profiles from the plurality of recipients do not have access permission to the location resource;
   communicate, visually using the messaging application, which recipients do not have access permission by color coding a user profile address for each recipient in an address bar of the messaging application;
   identify a first content data for the first content item;
   select a first user profile from the grouping of user profiles;
   receive access permission data for the first user profile to a first plurality of content items including a second content item;
   recommend one or more repositories for the first user profile based on a similarity between the first content item to the second content item within the one or more repositories, wherein the similarity is determined by the second content item sharing at least part of the first content data with the first content item; and
   determine a first alternate location resource, accessible to at least the first user profile, for the second content item within the one or more repositories.

19. The computer program product of claim 18, wherein the computer readable program causes the computing device to:
   select a second user profile from the grouping of user profiles;
   receive access permission data for the second user profile to a second plurality of content items including a third content item;
   recommend one or more repositories for the second user profile based on a similarity between the first content item to the third content item within the one or more repositories; and
   determine a second alternate location resource, accessible to at least the second user profile, for the third content item within the one or more repositories.

20. The computer program product of claim 19, wherein the computer readable program causes the computing device to:
   recommend the first alternate location resource to be sent to the first user profile and the second alternate location resource to be sent to the second user profile.

* * * * *